United States Patent [19]

Utsugi

[11] Patent Number: 5,177,730

[45] Date of Patent: Jan. 5, 1993

[54] RECORDING MEDIUM PLAYER APPARATUS

[75] Inventor: Nobuo Utsugi, Saitama, Japan

[73] Assignee: Pioneer Electronic Corporation, Tokyo, Japan

[21] Appl. No.: 513,464

[22] Filed: Apr. 23, 1990

[30] Foreign Application Priority Data

Aug. 31, 1989 [JP] Japan .................................. 1-225119

[51] Int. Cl.⁵ ...................... H05K 11/02; G11B 33/02
[52] U.S. Cl. .................................. 369/75.1; 360/137;
455/345; 455/346
[58] Field of Search ...................... 369/75.1, 77.2, 6, 7,
369/10, 11, 12; 360/99.02, 99.06, 133, 137;
455/345, 346

[56] References Cited

U.S. PATENT DOCUMENTS

| 3,134,945 | 5/1964 | Wertheimer | 455/346 |
|---|---|---|---|
| 4,530,081 | 7/1985 | Sakurai et al. | 369/75.1 X |
| 4,623,992 | 11/1986 | Kurosaki et al. | 369/12 X |
| 4,764,821 | 8/1988 | Aoki et al. | 360/137 |
| 4,866,552 | 9/1989 | Nagase . | |
| 5,010,437 | 4/1991 | Utsugi et al. | 360/137 |
| 5,046,059 | 9/1991 | Yoshida et al. | 369/36 |

FOREIGN PATENT DOCUMENTS

| 0227107 | 7/1987 | European Pat. Off. . | |
|---|---|---|---|
| 3336604 | 4/1984 | Fed. Rep. of Germany . | |
| 3344071 | 6/1984 | Fed. Rep. of Germany . | |
| 3644284 | 6/1987 | Fed. Rep. of Germany . | |
| 3624716 | 2/1988 | Fed. Rep. of Germany . | |
| 3726874 | 2/1988 | Fed. Rep. of Germany . | |
| 3700554 | 7/1988 | Fed. Rep. of Germany | 369/7 |
| 3728590 | 3/1989 | Fed. Rep. of Germany . | |
| 022929 | 10/1986 | Japan | 369/75.1 |
| 0017282 | 1/1989 | Japan | 369/6 |
| 0311494 | 12/1989 | Japan | 369/10 |

Primary Examiner—Eugene R. LaRoche
Assistant Examiner—Tan Nguyen
Attorney, Agent, or Firm—Sughrue, Mion, Zinn, Macpeak & Seas

[57] ABSTRACT

A recording medium player apparatus comprises a housing having an insertion slot formed at its front surface for insertion of a recording medium. An open/close body, which includes an operation portion, is provided at the front surface to cover or not cover the insertion slot. The player apparatus further comprises first, second and third link members and an engagement/stopper link member. The first link member has one end pivotally mounted on the open/close body. The second link member has one end pivotally connected to the other end of the first link member. The third link member has one end pivotally connected to the other end of the second link member. The engagement/stopper link member has one end pivotally connected to the other end of the third link member and is pivotally mounted at a center portion thereof to the housing. Thus, the engagement/stopper link member is releasably locked on the open/close body when the body is in a closed position. Further, a motor-driven movable member is pivotally connected to the second link member.

9 Claims, 9 Drawing Sheets

RECORDING MEDIUM PLAYER APPARATUS

BACKGROUND OF THE INVENTION

The present invention relates to a recording medium player apparatus such as a cassette tape recorder, and particularly to a recording medium player apparatus such as a small-sized cassette tape recorder having a recording medium insertion slot.

In the case of a mobile recording medium player apparatus such as a cassette tape recorder and, in particular, a so-called car-stereo apparatus disposed in the vicinity of a driver's seat in the car, the area available as an operation face of the recording medium player apparatus is extremely limited. For example, it is typical to provide not only an insertion slot for inserting a cassette tape as a recording medium, but also an operation control circuit, an indication circuit, etc. on the operation face of the cassette tape recorder body within a small area of, for example, about 18 cm×5 cm.

A suitable apparatus mounting location where the driver of the vehicle can very easily perform operation of the apparatus is only an extremely limited space, such as a portion of the vehicle dashboard or a console. Accordingly, it is required to additionally provide a circuit for operation control of a radio tuning function and for indication thereof within such a limited area of 18 cm×5 cm as described above.

As one countermeasure for accommodating the various circuits efficiently within such a small area, there is a method in which a dustproof door for covering a cassette tape insertion slot is also used as a dial portion of a radio receiver, for example, as disclosed in Japanese Utility Model Examined Publication No. 43-29326. In this method, wasted space is used effectively where the radio receiver, built-in type car-stereo apparatus is only used as a radio receiver. In contrast, where the car-stereo apparatus is used as a recording medium player apparatus, such as a tape recorder, the space cannot be used for disposing circuit elements for display and control because the dustproof door is pushed into the inside of the body when a cassette tape is inserted.

Recently, there has been a strong demand for a high degree of control functions in a recording medium player apparatus such as a tape recorder. That is, various functions such as jump selection to select programs by a particular piece of music, multi-program selection in which a program enables several pieces of music to be selected ahead of time, repeating play of a piece of music, selection of a particular type of tape (normal tape, chromium dioxide tape, metal tape), Dolby change-over (OFF, B-type, C-type), tape running direction change-over (in the case of auto-reverse apparatus), etc., are required in addition to the fundamental control. Fundamental control comprises the tape recorder, including control on PLAY (reproduction), FF (fast feed), REW (rewind), STOP (stoppage), and EJECT (take-out a tape cassette), on/off of power switch, sound volume, sound quality, etc. In addition, taking into consideration the devices for the change-over control of the above functions and for indication of those functions, it is difficult to provide circuits for the display and control functions within such a limited space of about 18 cm×5 cm. The difficulty is particularly acute in the case where a radio-tuning function, etc., is integrally provided in addition to a tape recorder function such as an audio appliance or in the case where a video function such as a television set, a VTR (video tape recorder), or the like, is provided in addition to such an audio function. In those instances, it is necessary to provide control and indication for the various functions, so that it is impossible to arrange all the devices for those functions within such a small space as described above.

If an indicator for indicating operational information with respect to operations of a playing portion, a tuner, etc., and play information with respect to contents of play, and so on, does not have a relatively large area, then an operator cannot distinguish or recognize the contents of information indicated. It is, however, difficult to increase the area of the indicator when a recording medium insertion slot is provided in the front surface of the player apparatus as described above, so that there is a disadvantage in that the indicator cannot achieve its indicating functions sufficiently.

Figure 11:
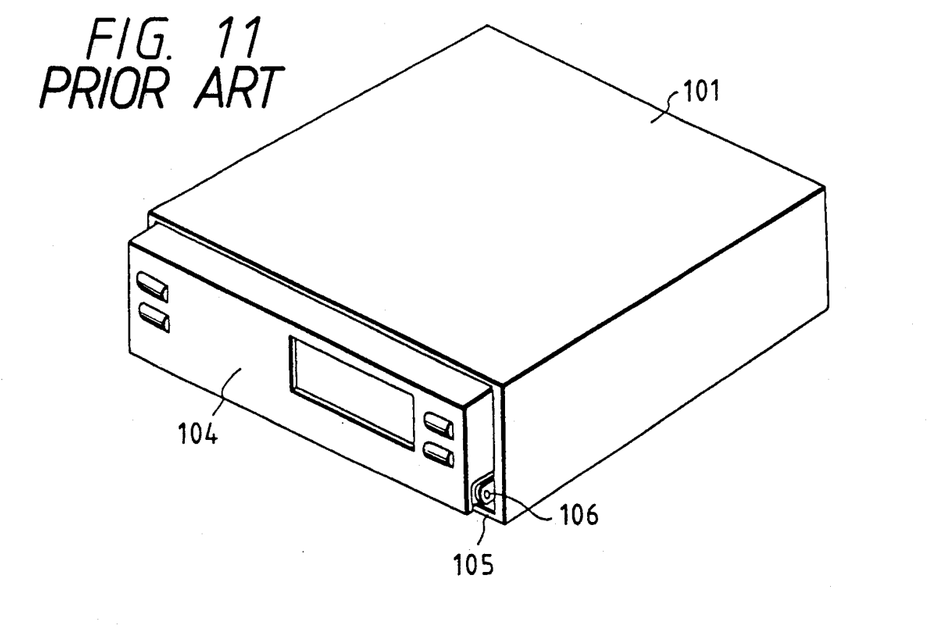
FIGS. 11 and 12 are perspective views of a conventional recording medium player apparatus.
Figure 12:
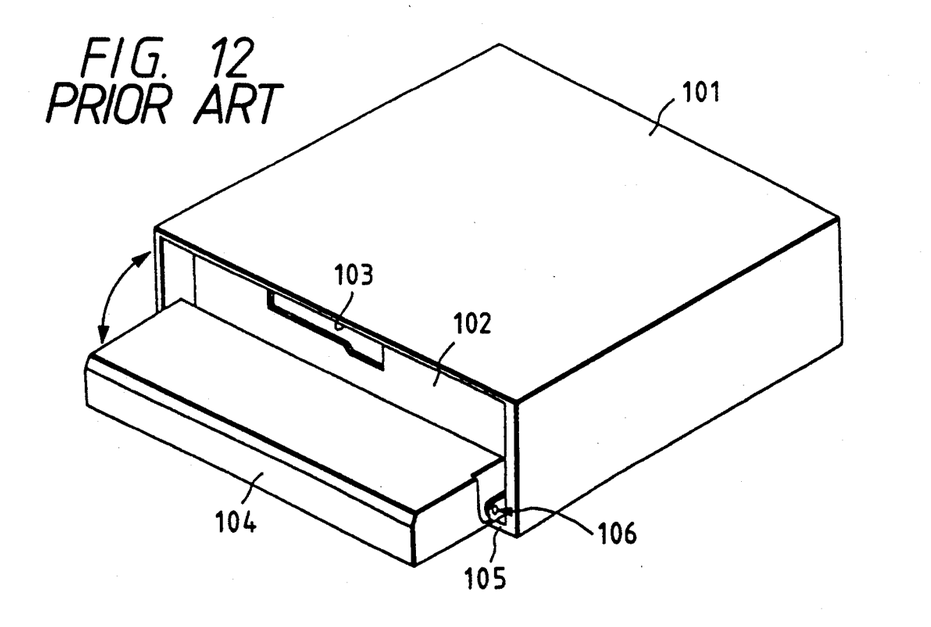

In order to solve such a problem, as shown in FIGS. 11 and 12, it is possible to provide a pivotally mounted open/close body 104 in front of a recording medium insertion slot 103 formed in a front panel portion 102 of a housing 101. Further, an operation portion for controlling the operation of the play means, an indicator portion for indicating the operating conditions of various functions, etc., are provided not only on the front panel portion 102, but on the open/close body 104. Thus, the positive enlargement of the area of the operation portion or indicator portion through the use of the open/close body makes it possible to cope with the expansion of the operation portion and the increase in the contents of the control information and the play information to be indicated. A recording medium player apparatus provided with such an open/close body has been proposed in, for example, Japanese Patent Application No. 1-11284.

Further, conventionally, the opening/closing of such a pivotal open/close body 104 has been performed through the transmission of a driving force of a built-in motor (not shown) in the recording medium player apparatus per se to the open/close body 104 by means such as a gear transmission mechanism.

On the other hand, when a recording medium player apparatus provided with such an open/close body 104 is mounted on a vehicle such as a car, it is necessary to lock the open/close body 104 in its closed position on the front panel portion 102 so as to prevent the open/close body 104 from freely opening/closing, even if vibrations and impact forces are exerted onto the recording medium player apparatus during running of the vehicle. To this end, therefore, an engagement/stopper is provided in the apparatus. Specifically, a hook-like engagement/stopper for locking the open/close body 104 onto the front panel portion 102 is suitably moved by a solenoid plunger between a locked position and an unlocked position.

As described above, the conventional recording medium player apparatus is provided with a driving means for opening/closing the open/close body 104 and another driving means for locking the open/close body 104 onto the front panel portion 102. This has presented a problem to be solved in view of the miniaturization of size and the reduction of cost as a whole of the recording medium player apparatus.

SUMMARY OF THE INVENTION

It is therefore an object of the present invention to provide a recording medium player apparatus in which the minimization of size and the reduction of cost have been realized with respect to the entire recording medium player apparatus.

The recording medium player apparatus according to the present invention comprises a housing enclosing a play means and having an insertion slot formed at its front surface portion for insertion of a recording medium carrying an information signal. An open/close body is provided so as to cover or not cover the front surface portion and is provided with an operation portion for controlling the operation of the play means. The apparatus further comprises: a first link member pivoted at its one end on the open/close body; a second link member pivoted at its one end on the other end of the first link member; a third link member pivoted at its one end on the other end of the second link member; and an engagement/stopper link member pivoted at its substantially central portion on the housing and pivoted at its one end on the other end of the third link member so as to be capable of being locked on the open/close body when the open/close body is in its closed position. Further, a movable member is provided so as to be movable in a predetermined direction and pivoted on the second link member. A driving force application means is provided for applying a driving force to the movable member. A limit means is provided for limiting a range of the pivotal movement of the engagement/stopper link member in a releasing direction of the lock of the engagement/stopper link member. Finally, a guide means is provided for guiding a mutual pivotal portion of the first and second link members in a direction substantially parallel to the direction of movement of the movable member.

In such configuration, the engagement/stopper member is made to pivot from the locking position by the initial operation of forward movement of the movable member based on the actuation of the above-mentioned driving force application means, so that the locked state of the open/close body in the closed position is released. Further, the pivotal movement of the engagement/stopper member in the lock-releasing direction by the further forward movement of the movable member is limited by the limit member and, at the same time, the first through third link members are actuated to perform the opening operation of the open/close body. On the contrary, in response to the backward movement of the movable member, the closing operation of the open/close body and the locking of the same at its closed position are performed through a process just reverse to that in the forward movement of the movable member.

DETAILED DESCRIPTION OF THE PREFERRED EMBODIMENTS

Referring to accompanying drawings, as an embodiment of the present invention; a cassette deck will be described hereunder.

Figure 1:
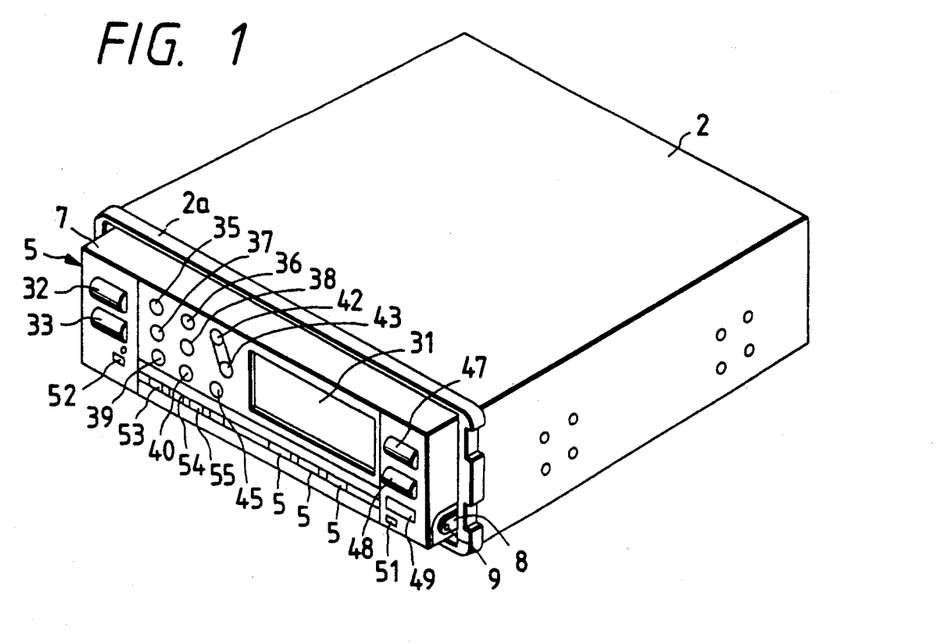
FIG. 1 is a perspective view of the cassette deck according to an embodiment of the present invention.
Figure 2:
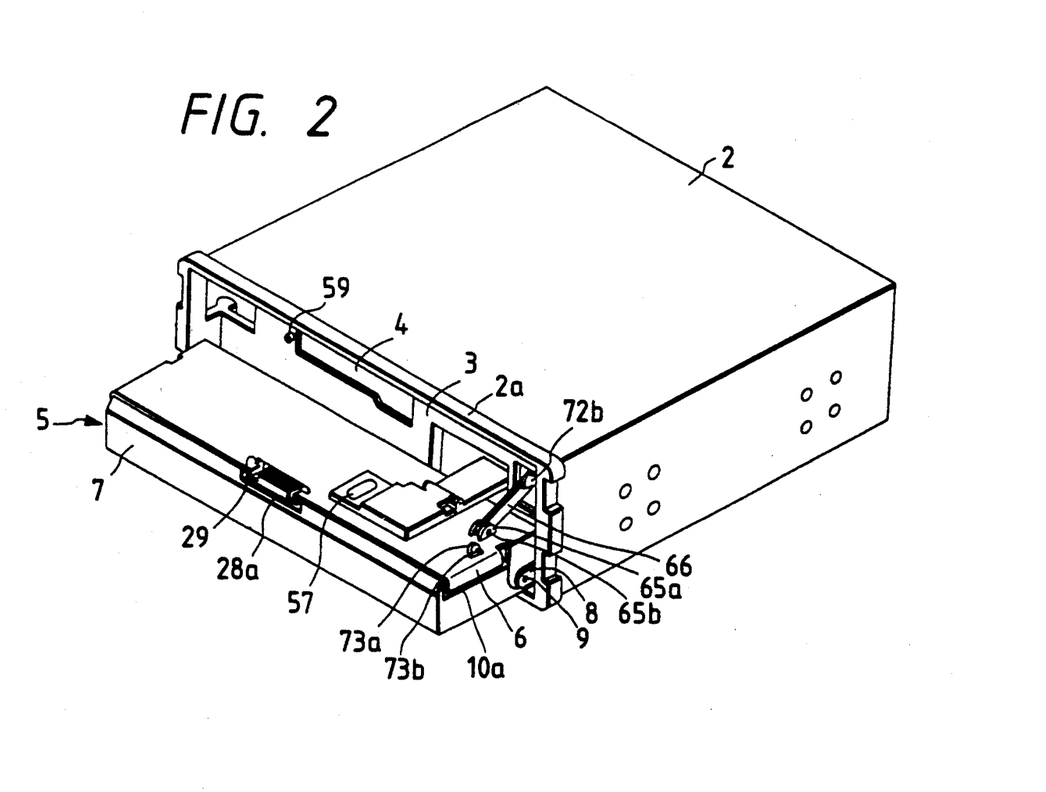
FIG. 2 is a perspective view showing the state where the open/close body of the cassette deck of FIG. 1 is opened.

As shown in FIGS. 1 and 2, the cassette deck has a housing including a cabinet portion 2 as a main part which is removably inserted and loaded into a holding space through an insertion slot of a holding box fixed on a dashboard (not shown) of a car. Further, a front surface portion of the cabinet portion 2, that is, a front panel portion 3 is exposed outside of the holding space.

The cassette deck is provided with an open/close body 5 for openably covering a cassette tape insertion slot 4 (see FIG. 2) formed in the front panel portion 3 for insertion of a cassette tape (not shown) acting as a recording medium.

Figure 3:
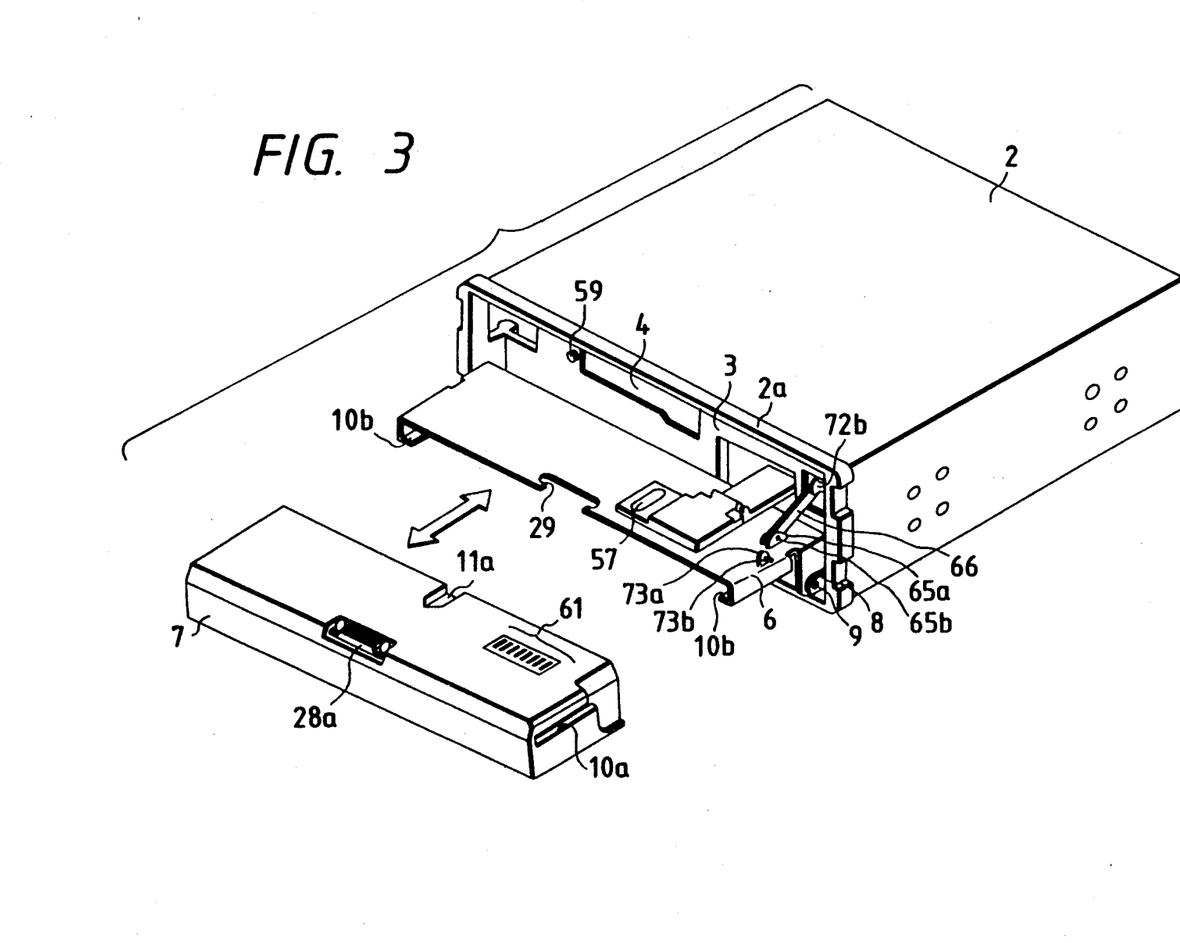
FIG. 3 is a perspective view showing the state where the outer cover portion including the operation portion is drawn out of the cassette deck of FIG. 1.
Figure 4:
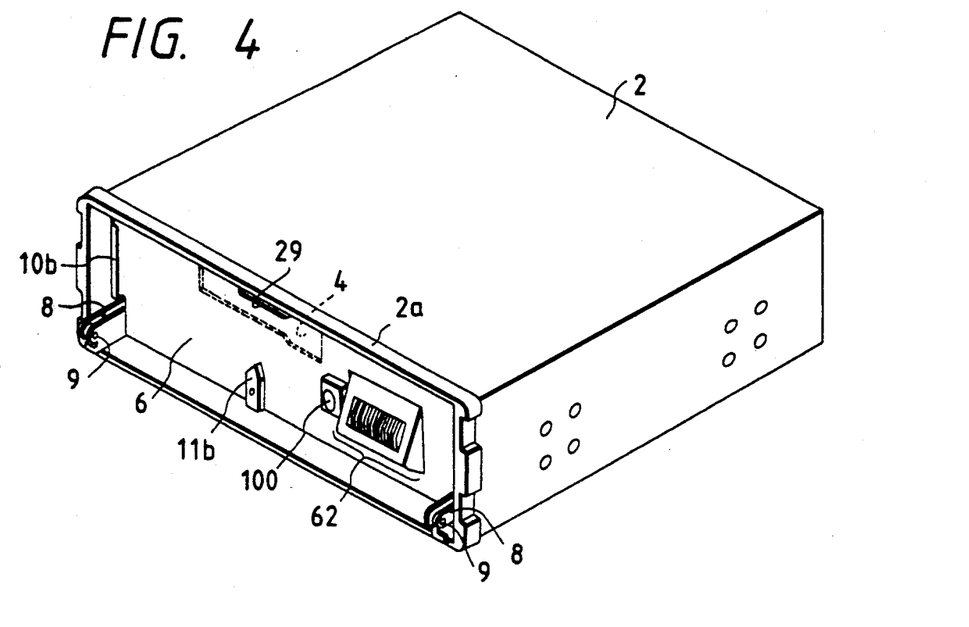
FIG. 4 is a perspective view showing the state after the outer cover portion including the operation portion has been drawn out of the cassette deck of FIG. 1.
Figure 5A:
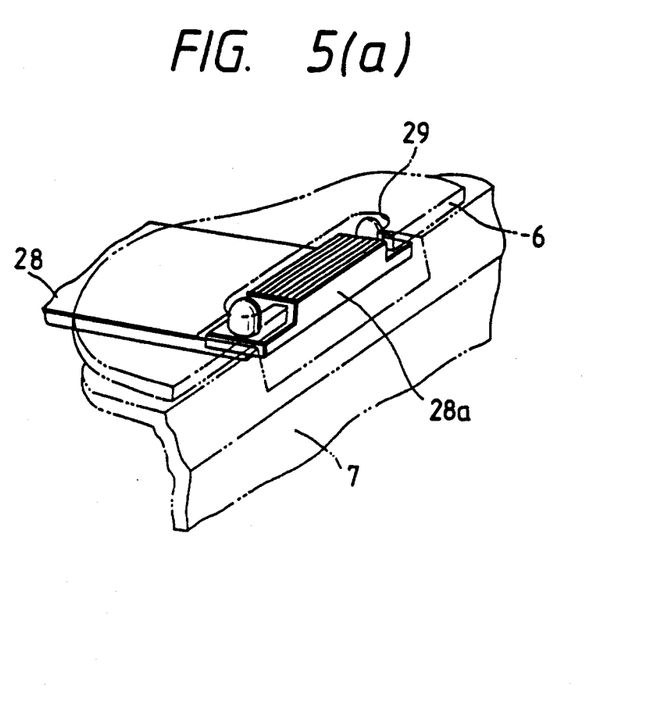
FIGS. 5(a), 5(b), 6 and 7 are detailed views of part of the cassette deck shown in FIGS. 1 through 4.
Figure 5B:
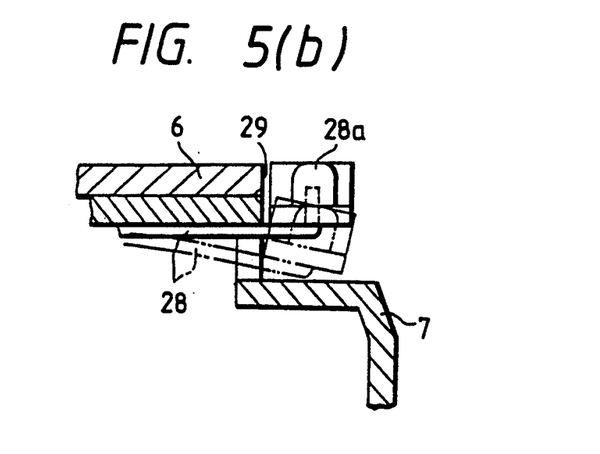

As shown also in FIGS. 3 and 4, the open/close body 5 is constituted by an inner cover portion 6 and an outer cover portion 7. The inner cover portion 6 is a generally rectangular plate made of a steel plate, or the like, and is pivotally attached at its transverse edge portions to support pins 9 which are attached to the front end lower portions of the cabinet 2 through brackets 8, respectively. The inner cover portion 6 can cover substantially the entire surface of the front panel portion 3 including the cassette tape insertion slot 4, and is arranged so as to open/close the cassette tape insertion slot 4 when it is pivoted.

On the other hand, the outer cover portion 7 is constituted by a hollow rectangular-parallelepiped housing made of resin, or the like, and is removably attached to the inner cover portion. More specifically, a slot 10a is formed in each of the longitudinally opposite ends of the outer cover portion 7 so that a U-shaped channel end portion 10b formed at each of the longitudinally opposite ends of the inner cover portion 6 slidably engages with the corresponding slot 10a. Further, an engagement recess portion 11a having a tip head portion is formed in the rear surface of the outer cover portion 7 and an engagement projecting portion 11b having a tip head portion is formed on the front surface portion of the inner cover portion 6 (see FIG. 4) so that the engagement projecting portion 11b can be fitted into the engagement recess portion 11a. When the outer cover portion 7 is mounted on the inner cover portion 6, the engagement recess portion 11a and engagement projecting portion 11b are engaged with each other so that the movement of the outer cover portion 7 in the longitudinal direction, that is, in the left/right direction, relative to the inner cover portion 6 is limited. Further, as shown in FIG. 1, when the inner cover portion 6 is in a closed position where the inner cover portion 6 closes the cassette tape insertion slot 4, the upward movement of the outer cover portion 7 attached to the inner cover portion 6 is limited by an edge portion 2a of the cabinet 2 projected forward further than the front panel portion 3 so that the outer cover portion 7 is prevented from coming off from the inner cover portion 6.

As shown in FIGS. 2, 3, 5(a), and 5(b), an engagement/stopper plate 28 having a plate spring fixed thereto in a cantilever relation is secured to a rear surface portion of the outer cover portion 7 and an engagement/stopper protrusion 28a is attached to a free end portion of the engagement/stopper plate 28. On the other hand, a pawl-like opening 29 is formed in the inner cover portion 6 so that the engagement/stopper protrusion 28a can engage with the opening 29. The engagement/stopper plate 28 and the opening 29 constitute an outer cover portion engagement/stopper means for locking the outer cover portion 7 to the cabinet portion 2, that is, for locking the outer cover portion 7 to the inner cover portion 6 which in turn is locked to the cabinet portion 2 by an engagement/stopper member as described below. By the provision of this outer cover portion engagement/stopper means, any play of the outer cover portion 7 is prevented.

Figure 6:
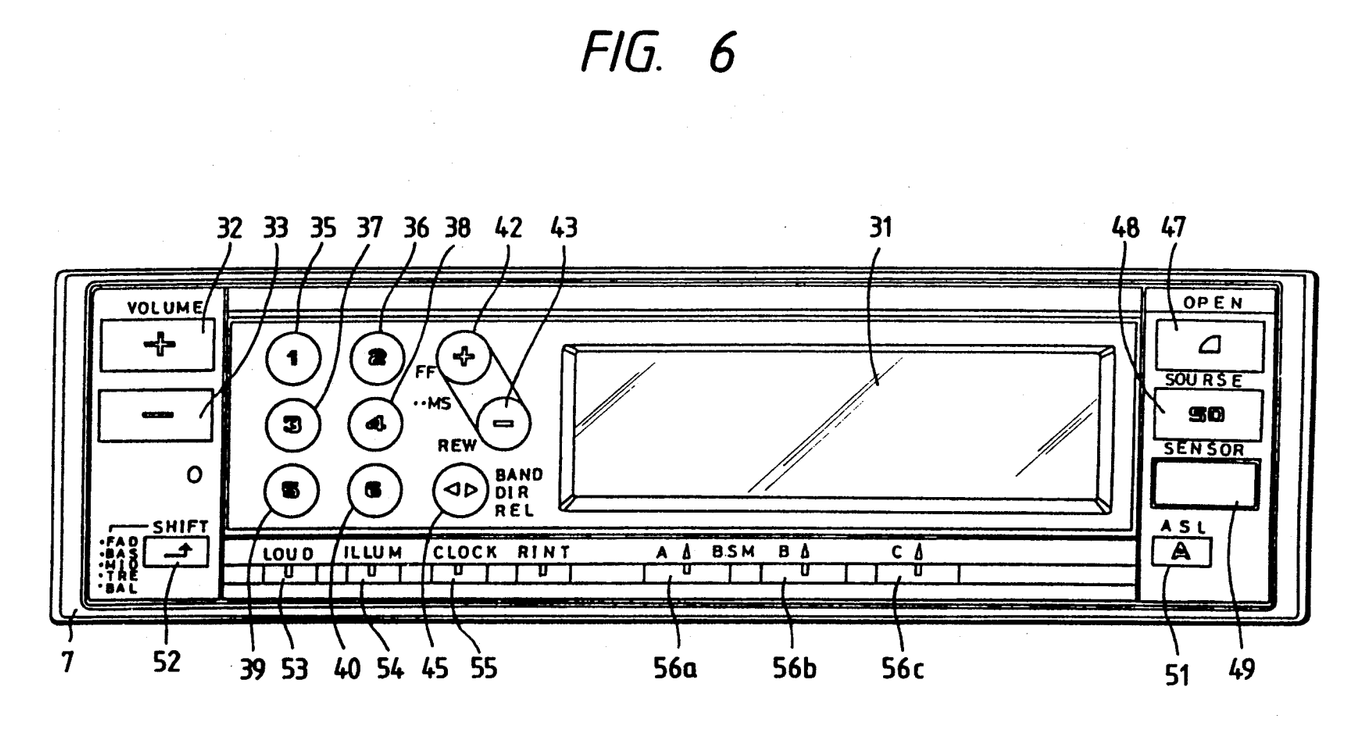

As shown in FIGS. 1 and 6, an operation portion including various operation switches for controlling operation of a cassette tape player and so on provided within the cabinet portion 2, and an indicator portion 31 are provided on the front surface portion of the outer cover portion 7. Further, an indicator driving circuit for driving the indicator portion is provided inside the outer cover portion 7.

As apparent particularly in FIG. 6, electronic sound volume control switches 32 and 33 are provided in the operation portion on the outer cover portion 7. The switches 32 and 33 serve to make the sound volume louder or softer while they are pushed down, respectively. Further, control switches 35–40, which are used for music jump-selecting operation, are provided so as to produce commands for indicating the number of pieces of music to be jumped to a target one ahead (or behind) of a current one. On the side of the control switches 35–40, a fast-feed switch 42, a rewinding switch 43, and a switch 45 for changing over the tape running direction in auto-reverse operation are provided.

A door open switch 47 is provided for opening the above-mentioned open/close body 5 and a source change-over switch 48 disposed under the door open switch 47 is provided for selecting which one of the cassette deck, the tuner, and the digital audio disc player, of the operation portion is to be used. The illustrated cassette deck is of the type having a built-in tuner function, and a disc play portion of the digital audio disc player is provided separately from the cassette deck. A sensor 49 is provided under the source change-over switch 48 for receiving a signal from a remote controller for remote controlling the operation portion. An automatic sound levelizing switch 51 is such that, if this switch is pushed, the sound volume is automatically made softer during the time of car stoppage, while the sound volume is made louder during the time of car running where noises become large.

A shift switch 52 is provided under the sound volume control switches 32 and 33, and a loudness switch 53, a clock switch 54, an illumination change-over switch 55, etc., are arranged in order on the side of the shift switch 52. When the illumination change-over switch 55 is pushed, the illumination color of the indicator portion 31 is changed into, for example, green and red. Under the indicator portion 31, there are provided change-over switches 56a–56c for selecting which one of the functions of the cassette deck, the tuner, and the digital audio disc player, the indicator portion 31 should perform indication for.

On the other hand, in the indicator portion 31 provided on the outer cover portion 7 together with the above-mentioned operation portion, indication is made with respect to the tape play time, the operation mode, the distinction of current playing side between the sides A and B, and so on, in use of the cassette deck. Indication is made with respect to the program selection information, the operation mode, etc. during use of the tuner, while indication is made with respect to the disc play elapsed time, the operation mode, etc. during use of the digital audio disc player. Further, as described above, an indicator driving circuit for driving the indicator portion 31 is provided inside the outer cover portion 7.

As shown in FIGS. 2 and 3, an eject switch 57 for ejecting a cassette tape is disposed on the rear surface of the inner cover portion 6. Further, door closure detection switches 59 are provided on the front panel portion 3 so that the switches 59 detect the open/close of the inner cover portion 6 through engagement with the inner cover portion 6.

The transmission/reception of signals between the operation portion provided on the outer cover portion 7 and the CPU (control circuit) provided in the cabinet portion 2 is performed through connection between the terminal groups 61 and 62 correspondingly provided on the rear surface portion of the outer cover portion 7 and the front surface portion of the inner cover portion 6, respectively (see FIGS. 3 and 4). Through the terminal groups 61 and 62, power is supplied to the outer cover portion 7 from the cabinet portion 2 side. The terminal groups 61 and 62 are connected to each other by mounting the outer cover portion 7 onto the inner cover portion 6 and disconnected from each other by removing the outer cover portion 7 from the inner cover portion 6. As described above, since the indicator driving circuit for driving the indicator portion 31 on the outer cover portion 7 is not provided on the cabinet portion 2 side but provided in the outer cover portion 7, the terminal groups of 61 and 62 are reduced in number.

Next, means for opening/closing the open/close body 5 constituted by the inner and outer cover portions 6 and 7 and for locking/releasing the open/close body 5 in the closed position onto/from the cabinet 2 will be described.

Figure 7:
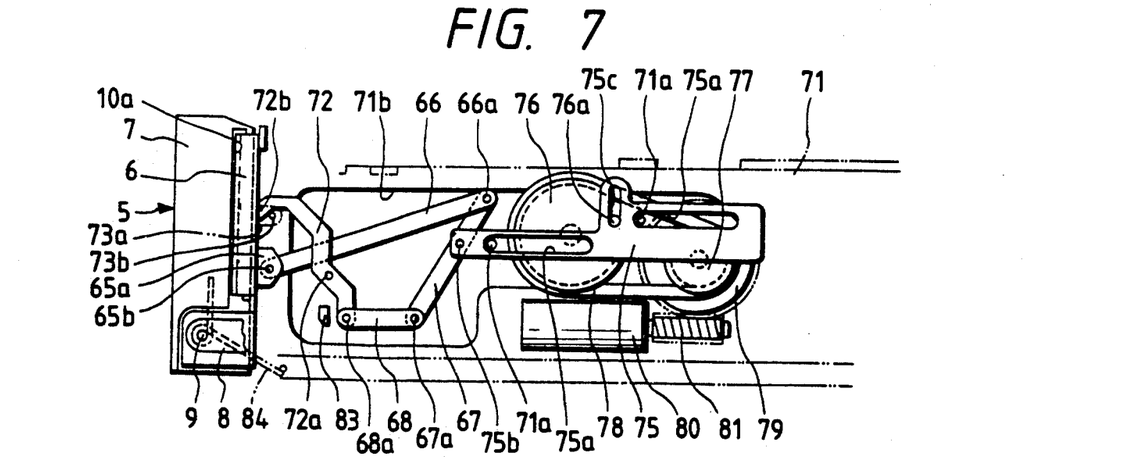

As shown in FIGS. 2, 3 and 7, a first linear link member 66 is pivoted at its one end portion to the free end back surface of the inner cover portion 6 through a bracket 65a and a pin 65b. A second linear link member 67 is pivoted at its one end portion to the other end portion of the first link member 66 through a pin 66a. Further, a third linear link member 68 is pivoted at its one end portion to the other end portion of the second link member 67 through a pin 67a. The other end portion of the third link member 68 is pivoted through a pin 68a to one end portion of an engagement/stopper link member 72. The engagement/stopper link member 72 is pivoted at its substantially central portion, through a pivotal pin 72a, to a chassis 71 which is fixedly provided in the cabinet 2 (shown in FIG. 1, etc.). The first link member 66, the second link member 67, the third link member 68, and the engagement/stopper link member 72 are arranged so as to pivotally move relative to each other within a plane parallel to a pivotal plane of the open/close body 5, that is, within a vertical plane so that the link members generally form a quadrilateral with the vertical plane. That is, the first link member 66 and the third link member 68 extend substantially in parallel to the horizontal direction, and the second link member 67 and the engagement/stopper link member 72 extend substantially in parallel to the vertical direction.

As shown also in FIGS. 2 and 3, a lock member in the form of a hook-like portion 72b is formed at the other end portion, that is, at the upper end portion, of the engagement/stopper link member 72 so that the hook-like portion 72b can be locked on an engagement/stopper pin 73b fixedly provided on the free end back surface portion of the inner cover portion 6 through a bracket 73a when the open/close body 5 is in the closed position.

As shown in FIG. 7, a movable member 75 is provided behind the second link member so as to be reciprocated horizontally, that is, frontward/rearward in this case. More specifically, a pair of support pins 71a are provided so as to project from the chassis 71 and so as to slidably engage with respective elongated holes 75a formed in the movable member 75. The movable member 75 is pivoted at its front end portion to the substantially central portion of the second link member 67 through a pin 75b. A large pulley 76 and a small pulley 77 are provided at the side of the movable member 75 and attached to the chassis 71 so as to rotate in a vertical plane. A belt 78 is entrained between the large and small pulleys 76 and 77. A worm wheel 79 is fixedly and concentrically attached on the small pulley 77 so as to engage with a worm 81 which is fitted to an output shaft of an electric motor 80.

A pin 76a is provided in the vicinity of the outer circumference of the large pulley 76 to project so as to smoothly engage with an elongated hole 75c which is formed in the movable member 75 and extends vertically. That is, the movable member 75 is arranged so as to reciprocate horizontally in response to the forward-/backward rotation of the motor 80.

On the other hand, as shown in FIG. 7, a stopper 83 is fixedly attached to the chassis 71 in front of the third link member 68 so as to engage with a lower portion of the engagement/stopper link member 72 at which the engagement/stopper link member 72 is pivoted to the third link member 68 so that the stopper 83 acts as a limit member for limiting the range of pivotal movement of the engagement/stopper link member 72 in the engagement releasing direction A substantially rectangular bracket 71b is formed in parallel to the above-mentioned various link members so that the mutual pivotal portion between the first and second link members 66 and 67 is in slidable contact with this bracket 71b so as to be guided in the direction substantially parallel to the direction of movement of the movable member 75. Further, as shown in FIG. 7, coil springs 84 are mounted on the support pins 9, which pivotally support the open/close body 5, so that the coil springs 84 urge the open/close body 5 clockwise toward a horizontal position. An open/close engagement/stopper means, for opening and closing the open/close body 5 and for locking and unlocking of the open/close body 5 in the closed position onto and from the cabinet 2, is constituted by the first link member 66, the second link member 67, the third link member 68, the engagement/stopper link member 72, the movable member 75, the driving force application means including the motor 80 for applying a driving force to the movable member 75, the stopper 83, and the bracket 71b of the chassis 71 which acts as a guide means for guiding the mutual pivotal portion between the first and second link members.

Figure 8:
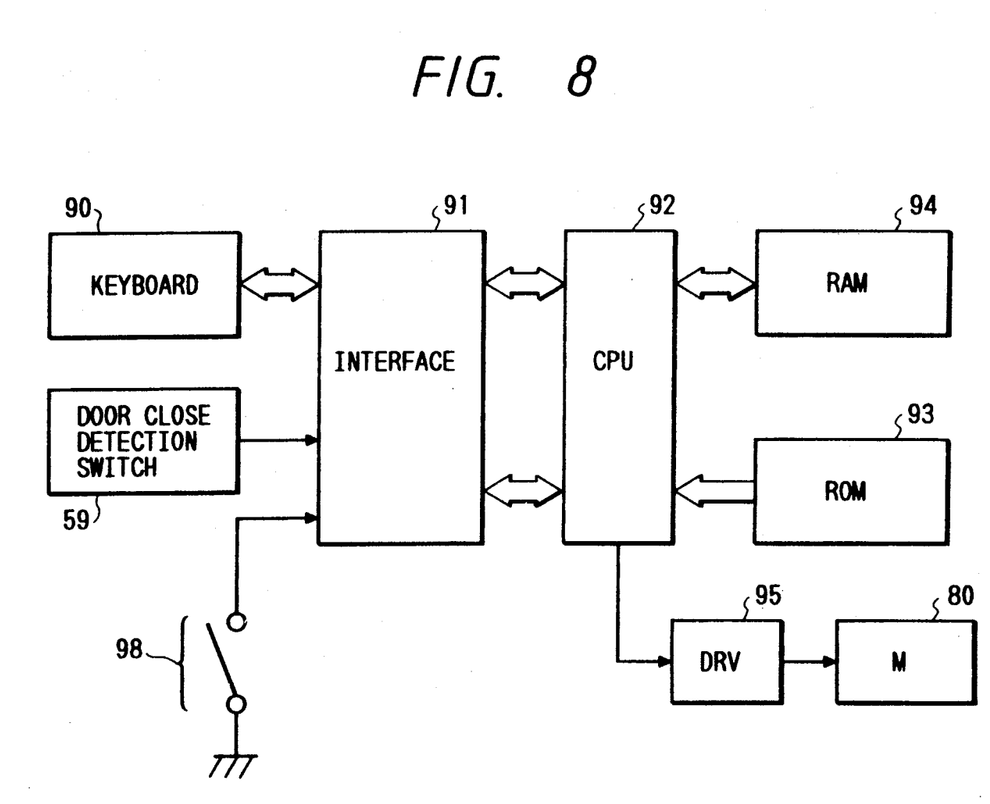
FIGS. 8, 9A-9C and 10, include a block diagram showing the control system for controlling the operation of the cassette deck shown in FIGS. 1-7, and operation explanatory diagrams.

Next, referring to FIGS. 8-10, a description will be made of the open/close operation of the open/close body 5 and the attachment/removal operation of the outer cover portion 7 in the configuration of the cassette deck as described above.

When the open/close body 5, which is in the closed position as shown in FIG. 1, is to be opened, the door open switch 47 among the switches of a keyboard provided on the outer cover portion 7 is pushed. As shown in FIG. 8, a signal generated from a keyboard 90 is transferred to a CPU (control circuit) 92 in the cabinet portion 2 through an interface 91 so that the CPU 92 supplies the motor 80 with a driving signal through a driving circuit (DRV) 95 in accordance with an operation program stored in a ROM (read only memory) 93 while using a RAM (random access memory) 94. When the door open switch 47 is pushed, the CPU 92 makes the motor 80 rotate forward. The driving force of the motor 80 is transmitted to the large pulley 76 through the worm 81, worm wheel 79, the small pulley 77 and the belt 78 in order to thereby make the large pulley 76 rotate counterclockwise so that the movable member 75 begins forward movement, that is, leftward movement in FIG. 7.

Figure 9A:
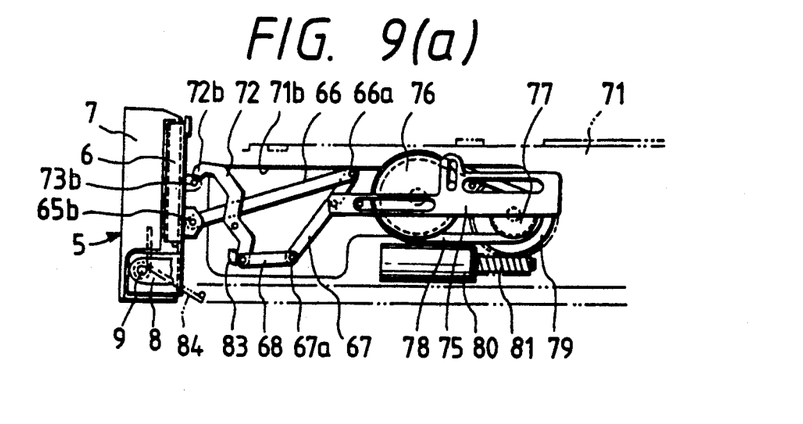

As shown in FIG. 9(a), by the initial forward movement of the movable member 75, first, the second link member 67 is made to pivot forward (clockwise) about the pin 66a. At this time, the first link member 66 cannot move forward because of the urging force of the coil springs 84 and because of the locking of the engagement/stopper link member 72 to the engagement/stopper pin 73b. Accordingly, only the above-mentioned clockwise pivotal movement of the second link member 67 about the pin 66a is performed at the point of time where the forward movement of the movable member 75 is initiated.

As shown in FIG. 9(a), by this clockwise pivotal movement of the second link member 67, the third link member 68 pivoted on the second link member moves forward so that the engagement/stopper link member 72 pivotally moves clockwise, that is, in the locking release direction to release the locking of the open/close body 5. When the hook-like portion 72b of the engagement/stopper link member 72 comes off from the engagement/stopper pin 73b provided on the open/close body 5 so that the locked state of the open/close body 5 is released, the mutual pivotal portion between the engagement/stopper link member 72 and the third link member 68 abuts against the stopper 83 so that the pivotal movement of the engagement/stopper link member 72 in the locking release direction is limited by the stopper 83.

Figure 9B:
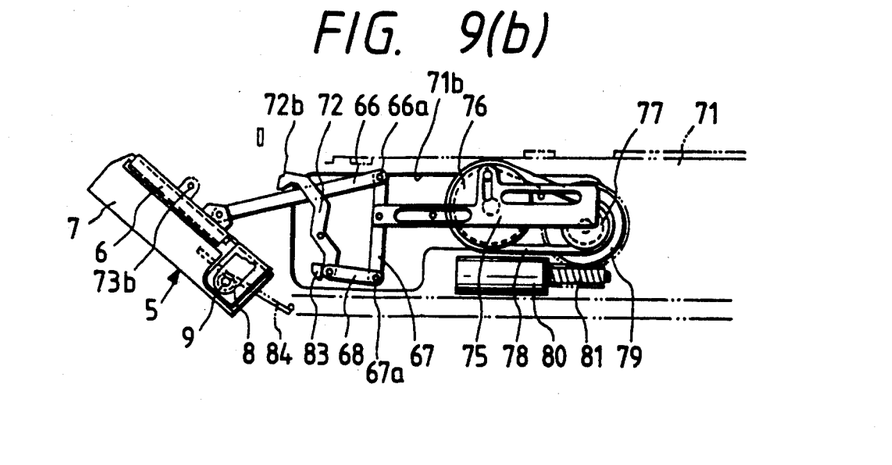
Figure 9C:
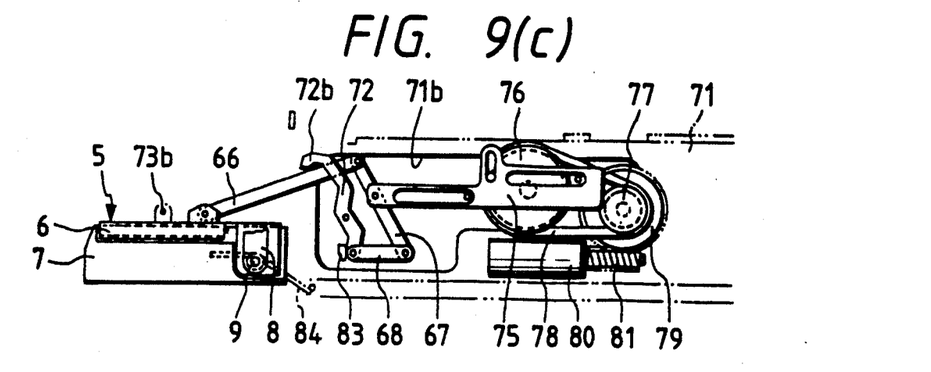

Thereafter, the motor 80 continues the forward rotation so as to make the movable member 75 move further forward, so that the second link member 67 begins to pivotally move forward about the pin 67a as shown in FIG. 9(b) because the forward movement of the third link member 68 is limited by the stopper 83. Accordingly, the first link member 66 projects forward so that the open/close body 5 constituted by the inner and outer cover portions 6 and 7 is pivotally moved to the opened position against the urging force of the springs 84.

By the swing of the inner cover portion 6 to the opened position, the door closure detection switches 59 on the front panel portion 3 (shown in FIG. 2, etc ) are actuated to change from the ON state to the OFF state so that CPU 92 stops the motor 80 after a predetermined time has elapsed from the actuation of the door closure detection switches 59.

Thus, the open/close body 5 reaches the opened position shown in FIGS. 2 and 9(b). In this state, the eject switch 57 on the rear surface of the inner cover portion 6 can be pushed so that the cassette tape (not shown) is ejected outside through the cassette tape insertion slot 4 of the front panel portion 3 so as to be withdrawn by the operator. When the operator parks the car in which the cassette deck is mounted so as to leave the car, the operator pushes down the engagement/stopper protrusion 28a so that the engagement/stopper plate 28 of the outer cover portion 7 is bent so as to release the locked state of the outer cover portion 7 to the inner cover portion 6 as shown by two-dotted chain lines in FIG. 5(b). Thus, the operator can draw out the outer cover portion 7 from the inner cover portion 6 to carry the outer cover portion 7 with him or with her.

Figure 10:
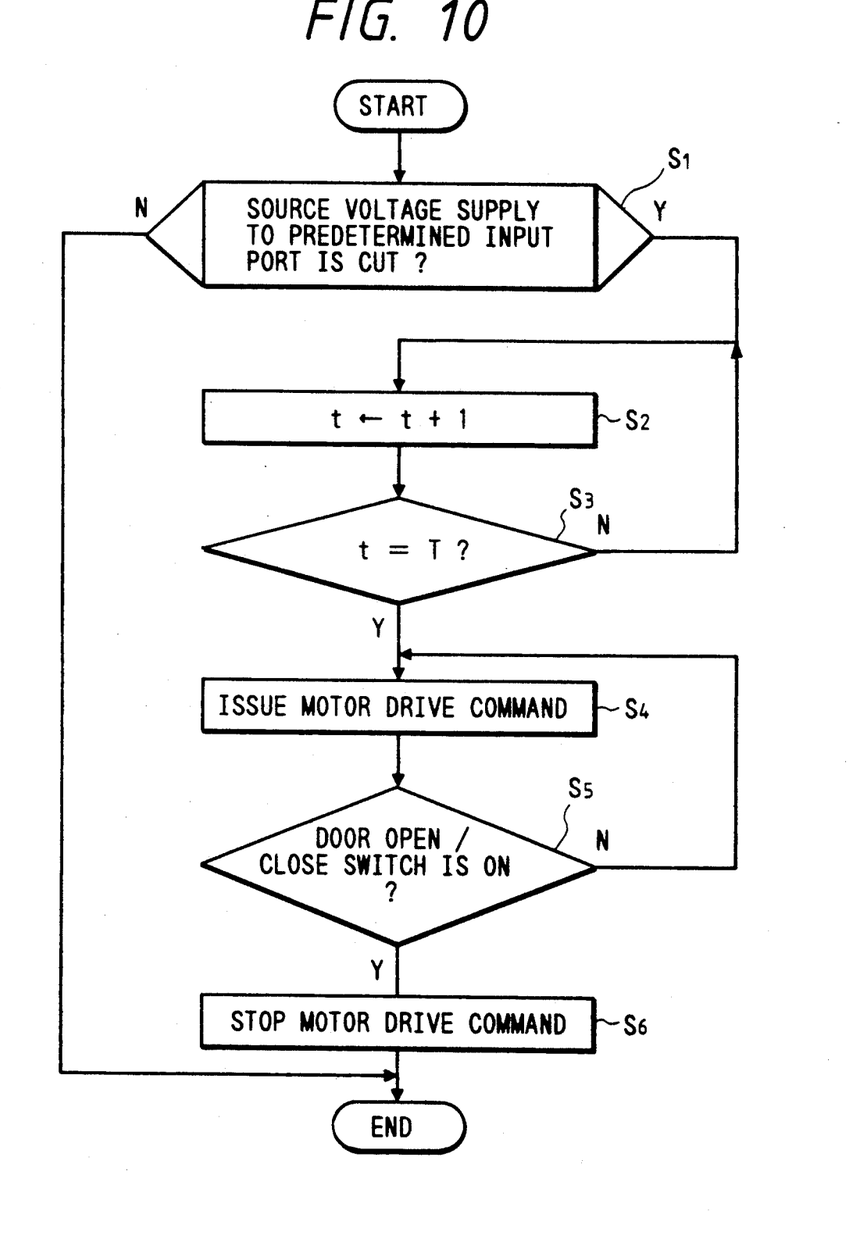

When the outer cover portion 7 is drawn out from the inner cover portion 6, the disconnection of any terminal 98 (shown in FIG. 8) of the connection terminals between the inner and outer cover portions 6 and 7, for example, a terminal through which electric power is supplied from the cabinet 2 side, is detected so that the inner cover portion is returned to the closed position in accordance with the flow chart shown in FIG. 10. That is, when the supply of the source voltage to a predetermined input port 98 is cut (step $S_1$), the CPU 92 waits for the lapse of a predetermined time T (for example 2-3 seconds) (steps $S_2$ and $S_3$) and then reverses the rotation of the output shaft of the motor 80 (step $S_4$). Accordingly, the inner cover portion 6 is made to swing toward the closed position as shown in FIG. 4 through the process just opposite to the above-mentioned opening operation so that the inner cover portion 6 is locked by the engagement/stopper link member 72 at the closed position. When the inner cover portion reaches the close vicinity of the closed position, the door closure detection switches 59 on the front panel portion 3 are turned on by the inner cover portion 6 (step $S_5$), so that the motor 80 is stopped (step $S_6$).

When the operator comes back to the car and intends to attach the outer cover portion 7 to the inner cover portion 6 again, it will suffice for the operator to push another door open switch 100 arranged on the front surface of the inner cover portion 6 as shown in FIG. 4. By depression of the door open switch 100, the inner cover portion 6 opens in the same operation as described above so that the operator can mount the outer cover portion 7 to the inner cover portion 6.

Although the draw-out of the outer cover portion 7 from the inner cover portion 6 is detected based on the fact that the power supply port to the outer cover portion 7 is cut in the above-mentioned embodiment, the present invention is not limited to this configuration, but is applicable to, for example, such a configuration that a detection switch for detection of attachment/removal of the outer cover portion 7 is provided on the inner cover portion 6 so that the inner cover portion 6 can be returned to the closed position in accordance with a detection signal from the detection switch.

In the above embodiment, the open/close body 5 is divided into the inner cover portion 6 which is pivotally mounted to the front panel portion 3 so as to open/close the cassette tape insertion slot 4, and the outer cover portion 7 which is arranged so as to be removably mounted on the inner cover portion 6 and includes the operation portion for controlling the operation of the play means provided within the cabinet portion 2. The present invention is not limited to such a configuration but is applicable to a modified configuration in which the outer cover portion 7 is pivotally attached to the front panel portion 3 with the inner cover portion 6 being omitted.

As described above in detail, in the recording medium player apparatus according to the present invention, means for driving an open/close body provided so as to openably cover a recording medium insertion slot formed in the front surface portion of a housing and for locking the open/close body in its closed portion to the housing is constituted by: a first link member pivoted at its one end on the open/close body; a second link member pivoted at its one end on the other end of the first link member; a third link member pivoted at its one end on the other end of the second link member; and an engagement/stopper link member pivoted at its substantially central portion on the housing and pivoted at its one end on the other end of the third link member so as to be capable of being locked on the open/close body when the open/close body is in its closed position. Further, a movable member is provided so as to be movable to reciprocate in a predetermined direction and pivoted on the second link member. A driving force application means is provided for applying a driving force to the movable member. A limit means is provided for limiting a range of pivotal movement of the engagement/stopper link member in a releasing direction of the lock of the engagement/stopper link member. Finally, a guide means is provided for guiding the mutual pivotal portion of the first and second link members in a direction substantially parallel to the direction of movement of the movable member.

That is, the open/close operation of the open/close body and the locking/unlocking of the open/close body in the closed position onto/from the housing are performed by a single driving means, so that the number of constituent members of the driving means is small and the reduction in size as well as in cost can be attained with respect to the entire recording medium player apparatus. Further, since the locking of the open/close body is performed mechanically by the engagement/stopper link member, the open/close body can be held firmly in the closed position so that the apparatus is excellent in anti-vibration properties.

What is claimed is:

1. A recording medium player apparatus comprising:
  a housing enclosing a play means and having an insertion slot formed at a front surface portion thereof for insertion of a recording medium carrying an information signal;
  an open/close body provided at said front surface portion so as to openably cover said insertion slot and being provided with an operation portion for controlling the operation of said play means, said open/close body being opened outwardly away from said housing;
  a linkage means for opening and closing and mechanically locking and unlocking said open/close body with respect to said housing, said linkage means comprising a lock member for being releasably locked on a back surface of said open/close body when said open/close body is in a closed position; and
  a single motor for applying a driving force to said linkage means.

2. A recording medium player apparatus according to claim 1, wherein said linkage means further comprises a link member, said lock member comprising a hook-like portion formed at an end of said link member, said hook-like portion adapted to be releasably locked on said back surface of said open/close body.

3. A recording medium player apparatus according to claim 1, wherein said apparatus further comprises an urging means for urging said open/close body toward a closed position.

4. A recording medium player apparatus according to claim 1, wherein said open/close body is constituted by an inner cover portion pivotally provided on said housing for openably closing said insertion slot, and an outer cover portion including said operation portion and which is slidably mounted on said inner cover portion so as to substantially cover said inner cover portion and be removable therefrom.

5. A recording medium player apparatus according to claim 3, wherein said open/close body is constituted by an inner cover portion pivotally provided on said housing for openably closing said insertion slot, and an outer cover portion including said operation portion and which is slidably mounted on said inner cover portion so as to substantially cover said inner cover portion and be removable therefrom.

6. A recording medium player apparatus according to claim 2, wherein the opposite other end of said engagement/stopper link member includes a hook-like portion for being releasably locked on a pin fixedly provided on a back surface of said open/close body when said open/close body is in a closed position.

7. A recording medium player apparatus comprising:
a housing enclosing a play means and having an insertion slot formed at a front surface portion thereof for insertion of a recording medium carrying an information signal;
an open/close body provided at said front surface portion so as to openably cover said insertion slot and being provided with an operation portion for controlling the operation of said play means, said open/close body being opened outwardly away from said housing;
a linkage means for opening and closing and mechanically locking and unlocking said open/close body with respect to said housing; and
a single motor for applying a driving force to said linkage means;
wherein said open/close body is constituted by an inner cover portion pivotally provided on said housing for openably closing said insertion slot, and an outer cover portion including said operation portion and which is slidably mounted on said inner cover portion so as to substantially cover said inner cover portion and be removable therefrom, wherein said outer cover portion includes a slot formed in each longitudinal opposite end thereof, and said inner cover portion includes a U-shaped channel end portion formed at each longitudinal opposite end thereof, whereby each of said U-shaped channel end portions slidably engages with a corresponding said slot.

8. A recording medium player apparatus comprising:
a housing enclosing a play means and having an insertion slot formed at a front surface portion thereof for insertion of a recording medium carrying an information signal;
an open/close body provided at said front surface portion so as to openably cover said insertion slot and being provided with an operation portion for controlling the operation of said play means, said open/close body being opened outwardly away from said housing;
a linkage means for opening and closing and mechanically locking and unlocking said open/close body with respect to said housing; and
a single motor for applying a driving force to said linkage means;
wherein said apparatus further comprises an urging means for urging said open/close body toward a closed position, wherein said open/close body is constituted by an inner cover portion pivotally provided on said housing for openably closing said insertion slot, and an outer cover portion including said operation portion and which is slidably mounted on said inner cover portion so as to substantially cover said inner cover portion and be removable therefrom, and further wherein said outer cover portion includes a slot formed in each longitudinal opposite end thereof, and said inner cover portion includes a U-shaped channel end portion formed at each longitudinal opposite end thereof, whereby each of said U-shaped channel end portions slidably engages with a corresponding said slot.

9. A recording medium player apparatus comprising:
a housing enclosing a pay means and having an insertion slot formed at a front surface portion thereof for insertion of a recording medium carrying an information signal;
an open/close body provided at said front surface portion so as to openably cover said insertion slot and being provided with an operation portion for controlling the operation of said play means, said open/close body being opened outwardly away from said housing;
a linkage means for opening and closing and mechanically locking and unlocking said open/close body with respect to said housing; and
a single motor for applying a driving force to said linkage means, wherein said linkage means comprises:
a first link member having one end and an opposite other end and being pivoted at said one end on said open/close body;
a second link member having one end and an opposite other end, said one end of said second link being pivoted on the other end of said first link member;
a third link member having one end and an opposite other end, said one end of said third link member being pivoted on the other end of said second link member;
an engagement/stopper link member having one end and an opposite other end and being pivoted at a substantially central portion thereof on said housing, said one end of said engagement/stopper link member being pivoted on the other end of said third link member so that the opposite other end of said engagement/stopper link member is releasably locked on said open/close body when said open/close body is in a closed position;
a movable member provided so as to be movable in a predetermined direction and pivoted on said second link member;
a transmission means for transmitting said driving force from said motor to said movable member;
a limit means for limiting a range of pivotal movement of said engagement/stopper link member in a lock-releasing direction of said engagement stopper link member; and
a guide means for guiding a mutual pivotal portion of said first and second link members in a direction substantially parallel to the predetermined direction of movement of said movable member.

* * * * *